US007054052B2

(12) United States Patent
Niklaus et al.

(10) Patent No.: US 7,054,052 B2
(45) Date of Patent: May 30, 2006

(54) ADHESIVE SACRIFICIAL BONDING OF SPATIAL LIGHT MODULATORS

(76) Inventors: Frank Niklaus, Fleminggatin 25, Stockholm 112 26 (SE); Göran Stemme, Ruddammsvagen 31B, Stockholm 114 21 (SE)

( * ) Notice: Subject to any disclaimer, the term of this patent is extended or adjusted under 35 U.S.C. 154(b) by 18 days.

(21) Appl. No.: 10/654,007

(22) Filed: Sep. 4, 2003

(65) Prior Publication Data

US 2005/0052725 A1 Mar. 10, 2005

(51) Int. Cl.
G02B 26/00 (2006.01)
C23F 1/00 (2006.01)
H01L 21/00 (2006.01)
H01L 21/44 (2006.01)
H01L 29/84 (2006.01)

(52) U.S. Cl. .................. 359/291; 359/292; 359/293; 359/295; 359/224; 359/226; 216/2; 438/29; 438/48; 438/52; 438/53; 438/599; 438/619; 257/415; 257/774; 348/771

(58) Field of Classification Search ............... 359/290, 359/291, 292, 295, 214, 224, 293, 226, 850; 438/24, 25, 28, 29, 48, 52, 53, 106, 108, 438/436, 519, 599, 619, 50; 257/415, 773, 257/774; 73/504.15, 754; 348/771; 216/2, 216/11, 13, 24
See application file for complete search history.

(56) References Cited

U.S. PATENT DOCUMENTS

| | | | | |
|---|---|---|---|---|
| 4,441,791 A | * | 4/1984 | Hornbeck | 359/295 |
| 5,142,405 A | * | 8/1992 | Hornbeck | 359/226 |
| 5,326,726 A | * | 7/1994 | Tsang et al. | 438/52 |
| 5,426,070 A | * | 6/1995 | Shaw et al. | 216/2 |
| 5,867,302 A | * | 2/1999 | Fleming | 359/291 |
| 5,898,515 A | * | 4/1999 | Furlani et al. | 359/290 |
| 5,926,309 A | * | 7/1999 | Little | 359/293 |
| 5,936,760 A | * | 8/1999 | Choi et al. | 359/298 |
| 5,963,788 A | * | 10/1999 | Barron et al. | 438/48 |
| 6,016,217 A | * | 1/2000 | Dotzel et al. | 359/292 |
| 6,060,336 A | * | 5/2000 | Wan | 438/50 |
| 6,071,752 A | * | 6/2000 | Furlani et al. | 438/52 |
| 6,535,318 B1 | * | 3/2003 | Wood et al. | 359/224 |
| 6,538,296 B1 | * | 3/2003 | Wan | 257/415 |
| 6,586,841 B1 | * | 7/2003 | Daneman et al. | 257/774 |
| 6,617,657 B1 | * | 9/2003 | Yao et al. | 257/415 |
| 6,720,201 B1 | * | 4/2004 | Lee et al. | 438/52 |
| 6,762,116 B1 | * | 7/2004 | Skidmore | 438/598 |
| 6,808,956 B1 | * | 10/2004 | Cabuz et al. | 438/52 |

* cited by examiner

*Primary Examiner*—Loha Ben
(74) *Attorney, Agent, or Firm*—Young & Thompson

(57) ABSTRACT

A method of combining components to form an integrated device, wherein at least one first component is provided on a first surface of a sacrificial substrate, and at least one second component is provided on a first surface of a non-sacrificial substrate. At least one support structure is formed on at least one of the first surfaces of the sacrificial substrate, and the non-sacrificial substrate, respectively, such that said at least one support structure is extended outwardly from at least one of the first surfaces. The sacrificial substrate carrying the first component, and the non-sacrificial substrate carrying the second component, respectively, are bonded, so that the first and second surfaces will be facing one another with a distance defined by a thickness of the support structure. At least a part of the sacrificial substrate is removed. The first component and second components are interconnected.

31 Claims, 4 Drawing Sheets

ADHESIVE SACRIFICIAL BONDING OF SPATIAL LIGHT MODULATORS

TECHNICAL FIELD

The present invention relates in general to techniques for forming an integrated device, e.g. a semiconductor device, and in particular to a method for integrating micro mirrors on an integrated circuit.

DESCRIPTION OF THE BACKGROUND ART

It is well known in the current art to build spatial light modulators (SLM) of a micro mirror type, e.g. U.S. Pat. Nos. 4,566,935, 4,710,732, 4,956,619. In general two main principles for building integrated devices, such as micro mirror SLM, have been employed.

An integrated circuit (IC) is manufactured to a finished state, and then the micro mirrors are manufactured on said IC. The micro mirrors are built onto the IC wafers. An advantage with this approach is that so called IC foundries can be used, which present a very cost efficient manufacturing of the electronics wafers. A disadvantage is that there is a very restricted selection of materials and methods that are usable for the manufacturing of the micro mirrors, because there is an upper temperature limit of about 400° C., above which the electronics will be damaged. This makes the manufacturing of micro mirrors having optimal performance more difficult.

Another way of building micro mirror SLM's is at the end of the process for making the IC, and micro mirror manufacture is started on the same wafers. The advantage with this approach is that there is a greater freedom of selecting materials, methods and temperatures for the manufacture of micro mirrors having good performance. A disadvantage is that the IC wafers cannot be manufactured in standard IC foundries. This is because IC wafers are subject to very strict demands on the process of manufacturing in terms of standardization in order to be able to maintain the quality in the process.

Therefore, there is a need in the art for an improved method for manufacturing micro electric/mechanical/optical integrated devices.

SUMMARY OF THE INVENTION

In view of the foregoing background, the method for manufacturing integrated devices, such as for example micro mirror SLM's, is critical for the performance of such devices.

Accordingly, it is an object of the present invention to provide an improved manufacturing method for an integrated device which overcomes or at least reduces the above mentioned problems.

In a first embodiment, the invention provides a method of combining components to form an integrated device, wherein at least one first component is provided on a first surface of a sacrificial substrate, and at least one second component is provided on a first surface of a non-sacrificial substrate. At least one support structure is formed on at least one of said first surfaces of said sacrificial substrate, and said non-sacrificial substrate, respectively, such that said at least one support structure is extended outwardly from at least one of said first surfaces. The sacrificial substrate carrying said at least one first component, and said non-sacrificial substrate carrying said at least one second component, respectively, are bonded with a temporarily intermediate bonding material, so that said first and second surfaces will be facing one another with a distance defined by a thickness of said support structure. At least a part of said sacrificial substrate is removed. Said at least one first component and said at least one second component are then interconnected.

In another embodiment, the invention further comprises the action of patterning said at least one first component after bonding said sacrificial substrate with said non-sacrificial substrate.

In yet another embodiment, the invention further comprises the action of arranging a metal layer on a first surface of said at least one first component facing away said non-sacrificial substrate after said bonding.

In still anther embodiment, the invention further comprises the action of arranging a metal layer on a second surface of said at least one first component facing said non-sacrificial substrate prior to said bonding.

In another of the invention embodiment, said metal layers on said first and second surfaces of said first component are of equivalent thickness.

In another embodiment, the invention further comprises the action of performing said interconnection of said at least one second component with said at least one first component with the help of said at least one support structure.

In another embodiment, the invention further comprises the action of securing said at least one first component to said non-sacrificial substrate with means other than said temporarily intermediate bonding material.

In another embodiment, the invention further comprises the action of stripping away said intermediate bonding material.

In another embodiment of the invention said support structure is made of electrically non-conducting material.

In another embodiment of the invention said support structure is made of electrically non-conducting material.

In another embodiment, the invention further comprises the action of depositing an electrically conducting material on at least a portion of a surface of said support structure, prior to said bonding, for forming an electrical connection between said at least one first component and said at least one second component.

In another embodiment, the invention further comprises the action of performing said securing of said at least one first component to said non-sacrificial surface and said interconnection of said at least one first component with said at least one second component in a single action.

In another embodiment of the invention said first component and said non-sacrificial surface are secured to each other by one of the group of evaporation, spin coating, sputtering, plating, riveting, soldering gluing.

In anther embodiment of the invention said intermediate bonding material is a low temperature adhesive, e.g., an organic material like a thermoset polymer, polyimide, benzocyclobutene (BCB), epoxy, photoresist. The intermediate bonding material can also be an inorganic material.

In another embodiment of the invention said first component is a micro mirror.

In another embodiment of the invention said first component is made of single crystalline silicon.

In another embodiment of the invention said second component is an integrated circuit.

In another inventive embodiment of the invention said integrated device is a micro mirror Spatial Light Modulator (SLM).

BRIEF DESCRIPTION OF THE DRAWINGS

For a more complete understanding of the present invention, and the advantages thereof, reference is now made to the following description taken in conjunction with the accompanying drawings, in which:

FIG. 7b illustrates schematically a side view of a portion of a micro mirror SLM shown in FIG. 7a.

DETAILED DESCRIPTION OF THE PREFERRED EMBODIMENTS

For the purpose of this application, the terms "wafer" and "substrate" are used interchangeably, the difference between them merely amounting to dimensions thereof.

"Component" shall be taken to mean any structure that is provided as a subunit on a wafer or substrate, and can comprise entire devices, as well as details of such devices, even a single piece of a material.

The method according to the present invention is particularly suited for the manufacturing of micro mirror Spatial Light Modulators. However, it would be applicable to a wide variety of thermal and non thermal detector devices, such as, but not limited to, quantum well detectors, pyroelectric detectors, bolometers, etc. It is particularly suitable when for some reason it is not possible to process/pattern/deposit a structure (e.g. a micro mirror array) directly on a substrate, where another structure (e.g. steering electronics) is present. This can e.g. be the case if the structure provided on said substrate is temperature sensitive to the process temperature for the processing of the structure to be provided thereon, or when the substrate is polycrystalline and the elements that are grown on top of the substrate must be monocrystalline.

Figure 1:
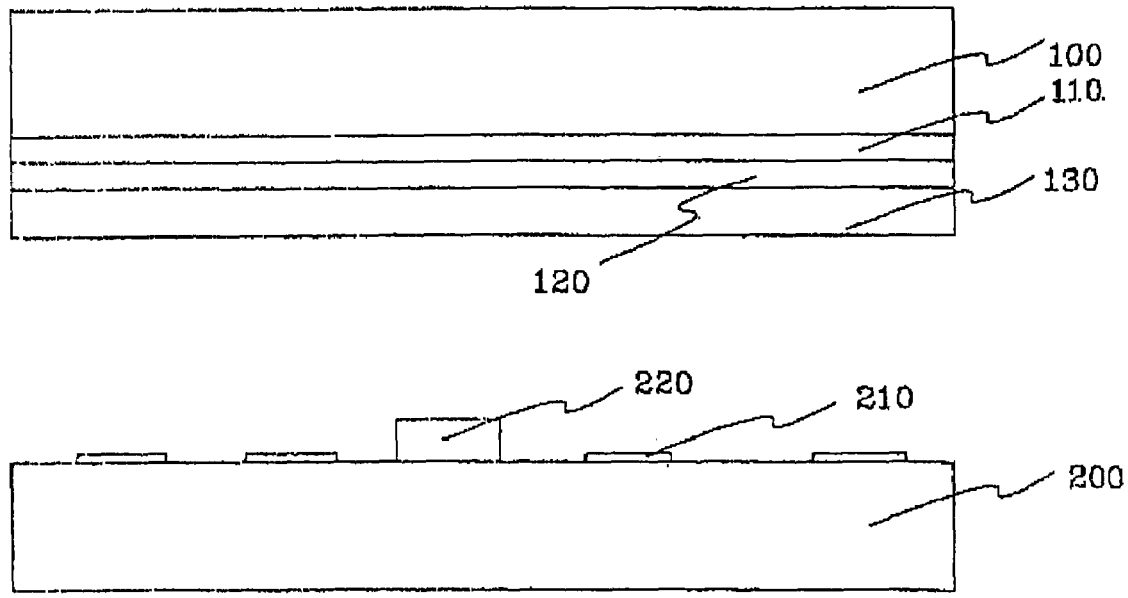
FIG. 1 shows a first process step according to an embodiment of the invention.

FIG. 1 illustrates schematically a first process step according to an embodiment of the invention. Thereby a first wafer 200, in the following referred to as a non-sacrificial substrate, having control electronics (and/or other types of circuitry), is manufactured by some standard type and cost efficient process, such as those methods commonly employed in Application Specific Integrated circuit (ASIC) production, or in "IC" foundries.

On these non-sacrificial substrates there can for example be provided electrodes 210 and support structures 220, by means of which a device or devices 120 (e.g. micro mirror or some other type of component for example an electric/mechanical/optical component), provided on a second wafer 100, in the following referred to as a sacrificial substrate, and to be integrated with the pre-made non-sacrificial substrate 200 are to be attached to said non-sacrificial substrate 200. The sacrificial substrate 100 may for instance be made of some semi-conducting material e.g. silicon. Between said sacrificial substrate 100 and said device or component 120 there is preferably arranged an etch stop layer made of for instance SiO2 110.

The component or components 120 is/are manufactured on one side of said sacrificial substrate 100, preferably made of silicon and most preferably single crystalline silicon, although other materials are possible, e.g. AlGaAs, glass, quartz, InP, Sic, SiN etc. Materials and processes for each wafer are selected for the best possible performance of each part (selectively, response times, life span requirements etc.).

In FIG. 1 the support structure 220 is arranged on said non-sacrificial substrate 200. By arranging said support structure 220 on the non-sacrificial substrate 200, the sacrificial substrate does not have to be aligned to the non-sacrificial substrate. However, it is possible to arrange the support structures 220 on said sacrificial substrate 100, i.e. on said component material 120; or on both the sacrificial substrate 100 and the non-sacrificial substrate 200, but then the sacrificial substrate 100 and the non-sacrificial substrate 200 have to be aligned.

The sacrificial wafer 100 may, as shown in FIG. 1, be coated with an uncured polymer layer 130. A suitable polymer is epoxy, although other materials are possible too, for example, BCB (benzocylobutene), any photoresist, any polyimide, any thermoset materials or any organic or inorganic adhesive material in general on top of said component or components 120.

However, said non-sacrificial substrate 200 may be coated with said uncured polymer layer 130 (not shown), either instead of coating said sacrificial substrate 100 or in addition to coating said sacrificial substrate 100. There might be different coatings on one or on both substrates 100, 200.

Figure 2:
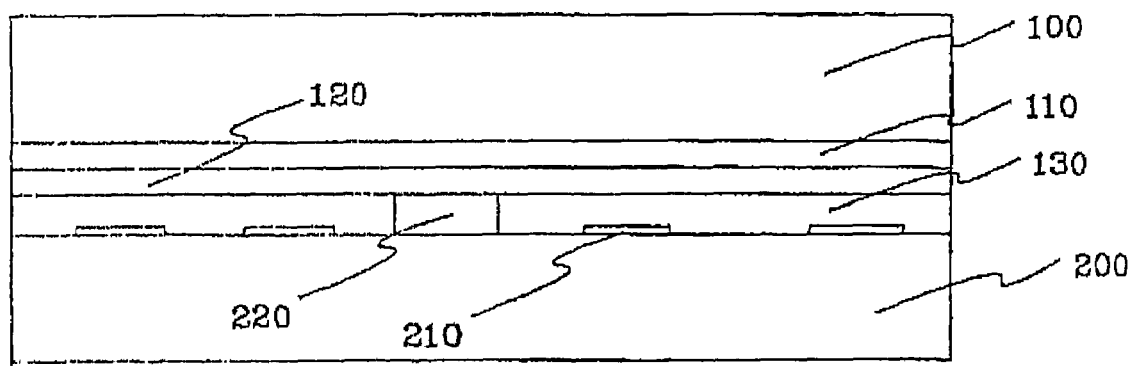
FIG. 2 shows a second process step according to an embodiment of the invention.

The sacrificial substrate 100 and the non-sacrificial substrate 200 may be brought together under pressure or without pressure and preferably also with heating, FIG. 2. Before they are brought together said adhesive material may be procured at 60° C. for about 5 min. Thus, the sacrificial substrate 100 and the non-sacrificial substrate 200 will be temporarily bonded together by the polymer layer 130, that functions as an adhesive material. This procedure can be performed with standard equipment. For example, the two wafers may be bonded together with a bonding pressure of about 1 bar in a vacuum. While applying the pressure the temperature of the wafer is ramped up to for example 200° C. for two hours to cure the adhesive material. The applied pressure is high enough so that the support structure 220 arranged on the non-sacrificial substrate 200 will contact the components 120 arranged on said sacrificial substrate 100.

When, as shown in FIG. 1, the adhesive material 130 is arranged on the sacrificial substrate one cannot completely remove all adhesive material between the support structure 220 and the component 120 if the free top surface of said support structure facing said adhesive material is completely flat. However, by forming said top surface of said support structure like a curved surface or the like, such effect can be eliminated or at least reduced to a significant degree.

The component 120 may be covered by at least one metallization layer or layer of another material (not shown) facing said non-sacrificial substrate 200.

When said adhesive material is arranged on said non-sacrificial substrate 200, said adhesive material can be removed from said top free surface of said support structure 220 prior to said bonding step. Preferably said adhesive material 130 is removed by lithographical methods, lapping or polishing. The adhesive material 130 may for instance be applied to said non-sacrificial substrate 200; to said sacrificial substrate 100; or to both said non-sacrificial substrate 200 and said sacrificial substrate 100, by spinning, i.e. rotating the substrate while applying the adhesive material. When removing the adhesive material 130 from the top free surface of the support structure by means of lithography methods some adhesive material in areas around said support structure 220 may also be removed. In the same way, if the adhesive material is applied on the sacrificial substrate 100, the adhesive material may be patterned with lithographical methods in order to create space for the support structure 220. Said space may be bigger than necessary or essentially the same size as the support structure. The patterning of the adhesive layer takes place before bonding the sacrificial substrate 100 to the non-sacrificial substrate 200.

By choosing a predetermined thickness of said support structure 220 and arranged one or a plurality of them on either substrate 100 or 200 the distance between the sacrificial substrate 100 and the non-sacrificial substrate 200 can be controlled. The distance between the non-sacrificial substrate 200 and the surface of the component 120 facing the non-sacrificial substrate 200 will essentially be the thickness of the support structure. It may vary a little due to the fact that some intermediate bonding material will still be left between the top of the support structure.

Figure 3:
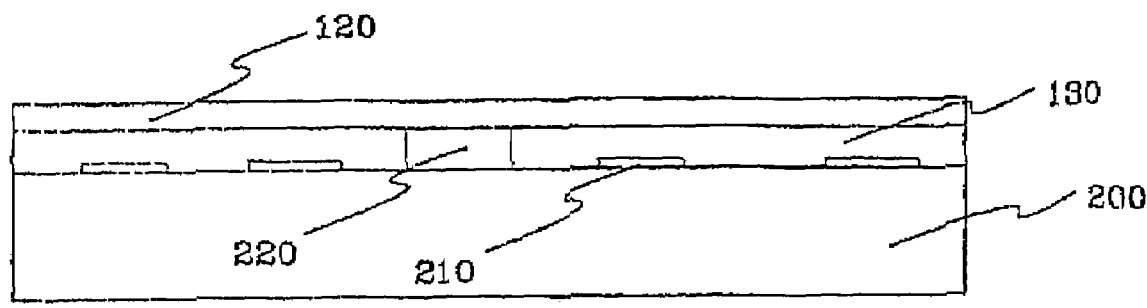
FIG. 3 shows a third process step according to an embodiment of the invention.
Figure 4:
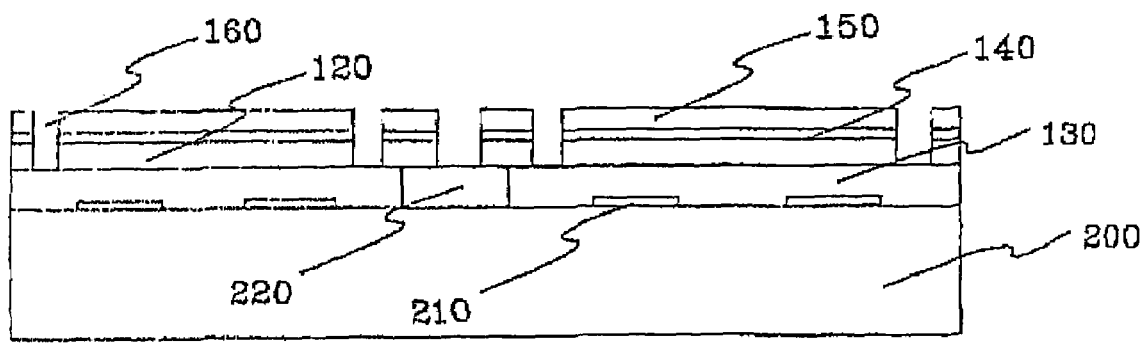
FIG. 4 shows a fourth process step according to an embodiment of the invention.

The sacrificial substrate 100 may partly or wholly be etched away, FIG. 3, or removed in some other way, such that for example only the actual component remains. This can be done by wet etching, e.g. by using KOH, EDP, TMAH or grinding/polishing, just to mention a few possibilities, and the skilled man will find suitable techniques using his ordinary knowledge. Dry etching of e.g. RIE type can also be used. Said etch stop layer 110 may be needed on the semi-conducting sacrificial substrate, e.g. silicon, such that the etch will not be brought in contact with the adhesive material or the surface of the non-sacrificial substrate 200.

Etch stop layers may be removed by dry or wet etching. Etch step layers may be of Silicon dioxide; Silicon Nitride; or a suitable metal or other inorganic or organic material.

Thereafter an optional metallization step is performed. If the optical properties of the material used in the component or components 120 is not good enough another material with better optical characteristics can be arranged on said free surface of said component or components 120. The arrangement of said material may for instance be performed by using sputtering; plating; Chemical Vapor Deposition; or similar methods well known for a man skilled in the art. A material with good optical characteristics is aluminum, at least from the point of view of reflectivity.

In order to form a pattern on the component 120 a layer of photoresist 150 is spun on top of the free component surface either covered with a metallization layer 140 or not. By using well-known techniques of photolithography a desired pattern may be arranged in said layer of photoresist. By using an etching agent recommended for the used photoresist a well characterized pattern can be accomplished in said component material.

Figure 7A:
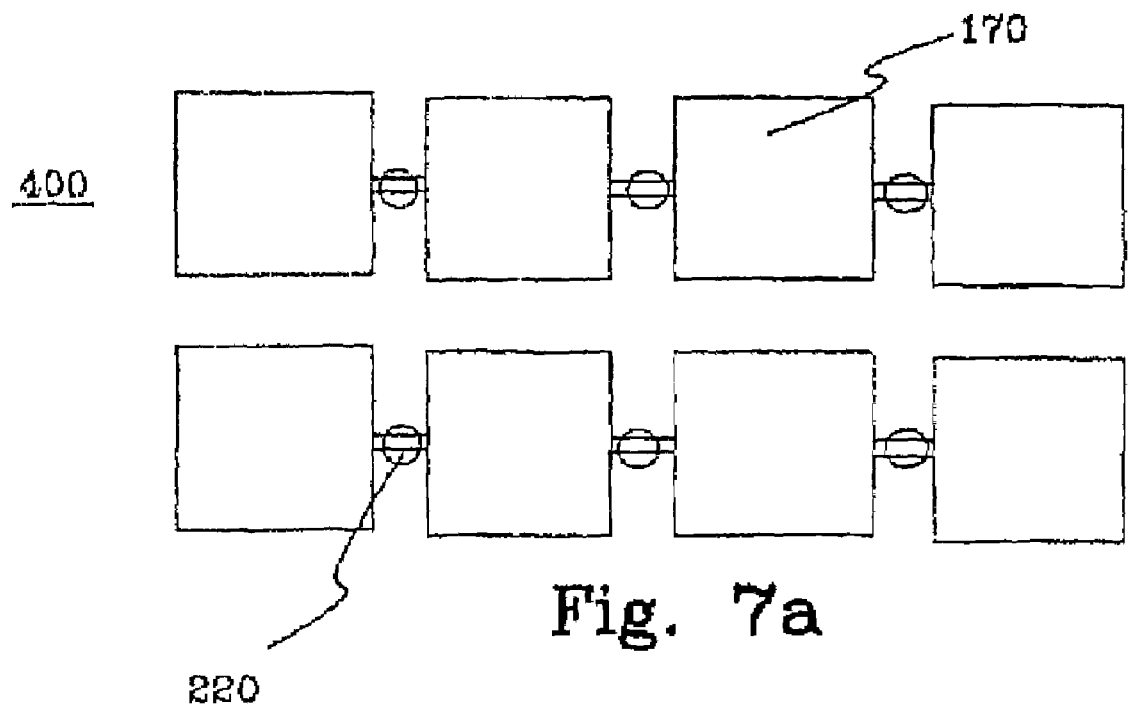
FIG. 7a illustrates schematically a top view of a portion of a micro mirror SLM.
Figure 7B:
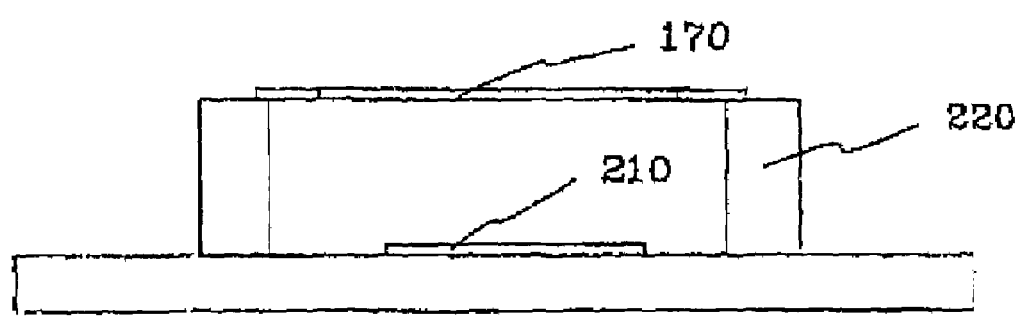

The pattern may for instance be the micro mirror array, a part of which 400 is shown in figure 7a, which is characterized by individually movable reflecting elements 170, see FIGS. 7a and 7b. Attached to said mirror elements are torsion or flexible elements in the form of hinges. When applying a first voltage on the electrode 220 and a second voltage on the reflecting element 170 the potential difference will create an electrostatical attraction force which will bend/move the reflecting element in a desired way.

In a next step the patterned component 120 may be interconnected with the non-sacrificial substrate by means of depositing a connecting material e.g. by sputtering, electroplating, evaporation, chemical vapour deposition or a similar deposition technology. Said interconnection can be performed with the help of the support structures 220, see FIG. 5. If the support structures 220 are made of electrically conducting material, or coated partly with an electrically conducting material, and the component material above said support structure is provided with a hole, said connecting material deposition can be done by plating, sputtering, evaporation or any other deposition technology.

Instead of metal riveting the support structure may be provided with a hollow space, for example U-shaped, in which for example the adhesive agent (a glue, photo resist or something similar) may be found. The adhesive agent physically connects the patterned component 120 with the support structure 220. In this embodiment the adhesive agent is enclosed in a volume defined by said hollow support structure and said patterned component 120.

The support structures can therefore be considered to have two functions. A first function is the first described namely to provide the sacrificial substrate 100 and the non-sacrificial substrate 200 in a predetermined distance from each other given by the thickness of said support structures. A second function would then be to assist in the interconnection of the component 120 with the circuitry (which e.g. could be a CMOS integrated circuit) provided in the non-sacrificial substrate 200. When said support structure is not made of electrically conducting material and said interconnection of said component 120 with said circuitry is meant to be electrical, said support structure has to be provided with an electrically conducting coating. Electrically conducting material can be deposited on at least a portion of the surface of said support structure, prior to said bonding, for forming an electrical connection between said component 120 and the circuitry in the non-sacrificial substrate 200.

However, there may be support structures with only a supporting function, i.e. to define a specific distance between the sacrificial substrate and the non-sacrificial substrate after bonding.

Figure 5:
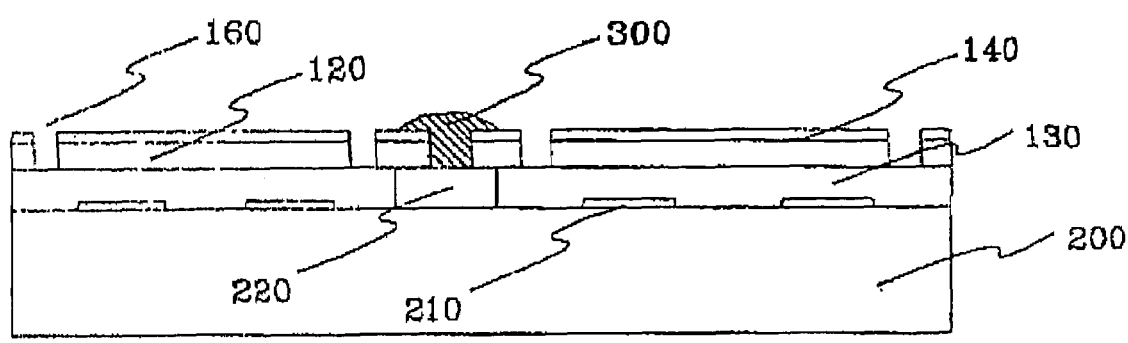
FIG. 5 shows a fifth process step according to an embodiment of the invention.
Figure 6:
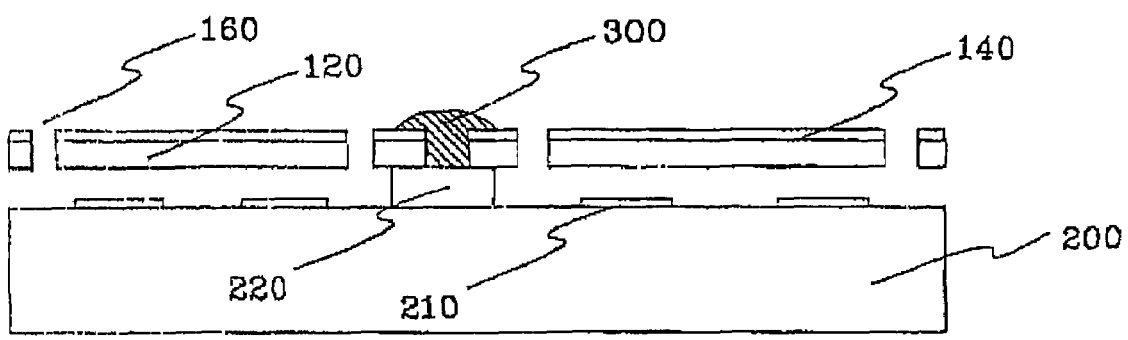
FIG. 6 shows a sixth process step according to an embodiment of the invention.

As can be seen in FIG. 5, the metal rivet may extend outwardly from the surface of the component. Said outwardly extending part may be removed by polishing, lapping or similar methods.

The metal rivet does not only form an electrical connection between said circuitry in said non-sacrificial substrate 200 and said component 120 but also secures said component 120 to said support member. By having secured the component to said support member it is safe to remove the temporary adhesive bonding material 130 by for example an appropriate etching agent.

The support structure may be made of the adhesive bonding material 130. The structures may be made by lithographical methods, where the support structures will be cured by electromagnetic radiation while the remaining adhesive bonding material stays in original form.

The outmost surface or the entire film, which may be of semiconducting material, of the sacrificial substrate 100 facing the non-sacrificial substrate 200 may be doped. This doping makes the material electrically conducting.

The component or components 120 may have a layered structure of different materials. This layered structure functions as a stress compensation. One material may be silicon and the other material may be a metal or silicon nitride or silicon dioxide.

The elements which are to be arranged on the non-sacrificial substrate may partly or completely be pre-patterned on the sacrificial substrate. For example SLM micro mirrors may be formed on said sacrificial substrate prior to bonding said sacrificial substrate with said non-sacrificial substrate.

A Spatial Light Modulator according to an embodiment of the present invention has a plurality of modulating elements in the form of micro mirrors 120. These micromirrors are made of a single crystalline material. Examples of suitable materials are single crystalline silicon, single crystalline germanium, single crystalline germanium, single crystalline gallium arsenide, single crystalline indium phosphide or single crystalline silicon carbide. There are support members 220 which electrically and/or mechanically interconnect said micromirrors to a substrate 200 on which there is provided at least one integrated circuit (made by but not limited to for example CMOS, bi-CMOS, bi-polar, and similar processes). The support members essentially define the distance between the micromirror and said substrate.

The micro mirrors are preferably made of a high temperature annealed and/or high temperature deposited (single crystalline) material.

Thus, although there has been disclosed to this point particular embodiments of the method of combining components to form an integrated device, it is not intended that such specific references be considered as limitations upon the scope of this invention except in-so-far as set forth in the following claims. Furthermore, having described the invention in connection with certain specific embodiments thereof, it is to be understood that further modifications may suggest themselves to those skilled in the art. The intention is to cover all such modifications to fall within the scope of the appended claims.

The invention claimed is:

1. A method of combining components to form an integrated device, comprising the following steps:
    providing at least one first component on a first surface of a sacrificial substrate,
    providing at least one second component on a first surface of a non-sacrificial substrate;
    forming at least one support structure on at least one of said first surfaces of said sacrificial substrate, and said non-sacrificial substrate, respectively, such that said at least one support structure is extended outwardly from at least one of said first surfaces;
    bonding said sacrificial substrate carrying said at least one first component, and said non-sacrificial substrate carrying said at least one second component, respectively, with an intermediate bonding material, so that said first surfaces will be facing one another with a distance essentially defined by a thickness of said support structure,
    removing at least a part of said sacrificial substrate;
    mechanically and/or electrically interconnecting said at least one first component and said at least one second component.

2. The method according to claim 1, further comprising the action of:
    patterning said at least one first component after bonding said sacrificial substrate with said non-sacrificial substrate.

3. The method according to claim 2, wherein said first component is a micro mirror.

4. The method according to claim 1, further comprising the action of:
    arranging a metal layer on a first surface of said at least one first component facing away from said non-sacrificial substrate after said bonding.

5. The method according to claim 4, further comprising the action of: arranging a metal layer on a second surface of said at least one first component facing said non-sacrificial substrate prior to said bonding.

6. The method according to claim 5, wherein said metal layers on said first and second surfaces of said first component are of equivalent thickness.

7. The method according to claim 1 comprising the action of:
    doping at least one first component made of semiconducting material and facing said non-sacrificial substrate prior to said bonding.

8. The method according to claim 1, further comprising the action of:
    providing at least one additional layer of stress compensating material on said first component.

9. The method according to claim 8, wherein said stress compensating material is at least one of the materials of: $SiO_2$, SiN, metal.

10. The method according to claim 1, further comprising the action of:
    performing said interconnection of said at least one second component with said at least one first component with the help of said at least one support structure.

11. The method according to claim 1, further comprising the action of:
    securing said at least one first component to said non-sacrificial substrate with means other than said intermediate bonding material.

12. The method according to claim 11, further comprising the action of:
    stripping away said intermediate bonding material.

13. The method according to claim 1, wherein said support structure is made of electrically non conducting material.

14. The method according to claim 1, wherein said support structure is made of electrically conducting material.

15. The method according to claim 13, further comprising the action of:
    depositing an electrically conducting material on at least a portion of a surface of said support structure, prior to said bonding, for forming an electrical connection between said at least one first component and said at least one second component.

16. The method according to claim 1, further comprising the action of securing said at least one first component to said non-sacrificial substrate and said interconnection of said at least one first component with said at least one second component in a single action.

17. The method according to claim 1, wherein said first component and said non-sacrificial substrate are secured to each other by one of the group of: evaporation, spin coating, sputtering, plating, riveting, soldering, gluing.

18. The method according to claim 1, wherein said intermediate bonding material is a low temperature adhesive polymer selected from polyimide, bensocyclobutene (BCB), epoxy, photoresist.

19. The method according to claim 1, wherein said first component is made of single crystalline material.

20. The method according to claim 19, wherein said first component is made of single crystalline semiconducting material.

21. The method according to claim 1, wherein said second component is an integrated circuit.

22. The method according to claim 1, wherein said integrated device is a micro mirror Spatial Light Modulator (SLM).

23. The method according to claim 1, wherein said support structure is hollow with an open end.

24. The method according to claim 1, further comprising the action of:
forming said support structure lithographically by patterning the intermediate bonding material prior to bonding.

25. The method according to claim 1, wherein said second component is at least partly prefabricated prior to bonding.

26. The method according to claim 1, further comprising the action of:
arranging a metal layer on a second surface of said at least one first component facing said non-sacrificial substrate prior to said bonding.

27. A Spatial Light Modulator comprising:
a substrate with at least one integrated circuit;
a plurality of micro mirror modulating elements that are individually movable reflecting elements to which hinge elements are attached, said reflecting elements being made of single crystalline material;
support members defining a spacing between said substrate and said modulating elements; and
interconnecting elements that electrically interconnect said modulating elements and said substrate.

28. The Spatial Light Modulator of claim 27, wherein said single crystalline material is selected from the group consisting of single crystalline silicon, single crystalline silicon germanium, single crystalline germanium, single crystalline gallium arsenide, single crystalline indium phosphate, and single crystalline silicon carbide.

29. The Spatial Light Modulator of claim 27, wherein said support members are at least partly coated with an electrically conducting material.

30. The Spatial Light Modulator of claim 27, wherein said hinge elements comprise torsion or flexible members.

31. A Spatial Light Modulator comprising:
a substrate with at least one integrated circuit;
a plurality of micro mirror modulating elements that are individually movable reflecting elements to which hinge elements are attached, said reflecting elements being made of one or more materials selected from the group consisting of high temperature annealed and high temperature deposited material;
support members defining a spacing between said substrate and said modulating elements; and
interconnecting elements that electrically interconnect said modulating elements and said substrate.

* * * * *